Aug. 3, 1965     D. C. SMITH ETAL     3,197,974
AUGER TYPE ICE CHIP MAKING MACHINE
Filed June 24, 1963     2 Sheets-Sheet 1

INVENTORS
Dave C. Smith
Lyle L. Smith
Joe E. Wadsack
BY
Frank C. Lowe
ATTORNEY

Aug. 3, 1965     D. C. SMITH ETAL     3,197,974

AUGER TYPE ICE CHIP MAKING MACHINE

Filed June 24, 1963     2 Sheets-Sheet 2

INVENTORS
Dave C. Smith
Lyle L. Smith
Joe E. Wadsack
BY
*Frank C. Lowe*
ATTORNEY

3,197,974
AUGER TYPE ICE CHIP MAKING MACHINE
Dave C. Smith, Denver, Lyle L. Smith, Littleton, and Joe
E. Wadsack, Denver, Colo., assignors to Ice-O-Matic,
Inc., Denver, Colo., a corporation of Colorado
Filed June 24, 1963, Ser. No. 289,810
6 Claims. (Cl. 62—320)

This invention relates to improvements in the manufacture of ice chips and to machinery therefor, a primary object of the invention being to provide a novel and improved arrangement of components within an ice chip producing machine which permit an efficient production of comparatively large, solid ice chips having a minimum free water content.

The basic components of a conventional ice chip producing machine include a water reservoir, a freezing unit which surrounds the reservoir to form ice on the inside walls thereof, and a wiping blade adapted to move across the inside walls of the reservoir to cut free the tiny ice flakes as they are formed.

In the operation of such a basic machine, it is preferred to feed water into the reservoir from the bottom thereof and to permit the water to rise to a selected level and permit the general movement of water and ice formed in the reservoir to be directed upwardly. To control the upward movement of water and ice and to regulate the water infeed, the ice chip producing machine will also include a standpipe along the reservoir connecting with the bottom of the reservoir and having a float-operated cut-off valve in its upper section.

The ice flakes, when removed from the wall of the reservoir by the wiping blade, will rise to the water surface where they could be either spilled over a lip at the top of the reservoir or be otherwise skimmed from the reservoir. However, the ice flakes removed from the reservoir wall are very small particles and they must be consolidated to some degree before being useable. Some consolidation will occur at the water surface in a natural manner when the ice flakes compact at the water surface. These flakes are intimately mixed with the water and form a slush which is unuseable unless a further consolidation into larger chips takes place. This consolidation may be accomplished in several ways, as by an additional freezing action or, in a more practical manner, by lifting the slush ice from the water to permit the water to drain therefrom.

To accomplish such objectives, the construction of conventional types of ice chip producing machines have followed a standardized pattern such as that disclosed in the patent to Nitsch, No. 2,597,515, issued May 20, 1952 or the patent to Trow et al., No. 2,753,694, issued July 10, 1956. The reservoir is formed as an upwardly inclined, or upstanding, cylindrical, bottom-closed shell with a freezing jacket being wrapped about it. A spiral blade is mounted upon a shaft in the shell and the spiral extends upwardly within the reservoir to contact the wall of the reservoir at all points and to effect a wiping action against the wall of the tube when the shaft rotates slowly. The direction of rotation of this spiral is such as to also effect an upward translatory movement of particles within the reservoir and to also lift the ice flakes above the surface of the water. At the same time excess water in the ice may flow back into the reservoir. This permits the ice particles to congeal into a mass of soft ice which is continually thrust upwardly and from the reservoir by the rotation of the spiral.

The manner of discharge of this soft ice from the reservoir has been of considerable concern to designers of ice chip producing machinery. If this soft ice were to become consolidated into a hard mass, it would clog and bind or even break down the machinery driving the spiral. Thus the soft ice must move out of the cylinder in an unimpeded manner and it must also be broken up as it moves upwardly above the spiral to prevent undue compaction and solidification. Several different arrangements have been devised to control and break up this flow of ice and to discharge it from the reservoir. In one arrangement, an inverted cone is mounted over the spiral shaft above the reservoir level. A cylinder of ice moving upwardly through the reservoir and about the spiral shaft will disintegrate into particles as it moves against the diverging face of the inverted cone. It may be adapted to fall into a container. In another arrangement, also using an open end, the cylinder of ice moves upwardly against the edge of a fixed plate mounted across the open top of the reservoir. This breaks the ice column apart so that the particles or chips may spill over the edge of the reservoir and thence into a container.

In another arrangement exemplified by the patent to Trow et al., a side-opening discharge port is provided in the wall of the reservoir near its upper end. With this arrangement, the upper end of the reservoir is closed and the ice moves upwardly and into a chamber above the spiral wherein the port is located. The ceiling or top of the chamber is inclined, tilted or otherwise sloped to provide a substantial tilt towards the discharge port to effectively turn the moving ice so that it may flow through the port. The flow of ice through the port may then be directed into a chute to be laterally shifted to a receiving bin alongside the machine.

In all of these arrangements, the ice chip producing machines actually discharge a soft ice from which some of the water has been drained. This is desirably accomplished without further compaction of the ice itself beyond that which will naturally occur as the water is drained from the ice,. The ice chips produced from such machines are necessarily a soft, partially consolidated product and usually carry a substantial amount of water. Such chips are considered inferior to ice cubes and solid ice chips, but they are accepted commercially since ice cubes and solid chips are more expensive. Nevertheless, there is a real and definite need for an improved, low-cost machine for producing a more solid, drier ice chip.

The present invention was conceived and developed to meet this need. It was recognized that with sufficient compaction and compression of the chips, excess water will be squeezed out and the ice chips will then become solidified and hardened to any degree desired, even to the extent of producing a cylinder of hard, solid ice. It was also discovered that certain types of conventional ice chip producing machines could be altered by very simple modifications to operate upon a new principle of squeezing the ice before releasing it, in contrast with conventional modes of operation where the ice chips are pushed out of the machine in as smooth a manner as possible.

It follows that another object of the invention is to provide a novel and improved ice chip producing machine which is adapted to produce larger, drier and harder ice chips.

Another object of the invention is to provide a novel and improved ice chip producing machine for producing improved ice chips, wherein the chip-forming chamber is adapted to naturally retain ice flakes from the freezing chamber and to consolidate and drain the flakes under a moderate degree of pressure before discharging the resulting chips from the chamber.

Another object of the invention is to provide a novel and improved ice chip producing machine, which incorporates simple and inexpensive changes in conventional types of ice chip producing machines to effect a modified mode of operation of such machines, whereby the ice particles will be consolidated into comparatively large, dry chips before they are discharged from the machine.

Another object of the invention is to provide an ice chip producing machine having a novel and unique construction of a collection chamber above the freezing section which is especially adapted to retain and consolidate the ice flakes moving therein into solid, dry chips before discharging them.

Other objects of the invention are to provide a novel and improved ice chip producing machine which is a simple, neat appearing, rugged and durable unit.

With the foregoing and other objects in view, all of which more fully hereinafter appear, my invention comprises certain constructions, combinations and arrangements of parts and elements as hereinafter described, defined in the appended claims and illustrated in the accompanying drawing, in which:

Figures 1, 2, 3:
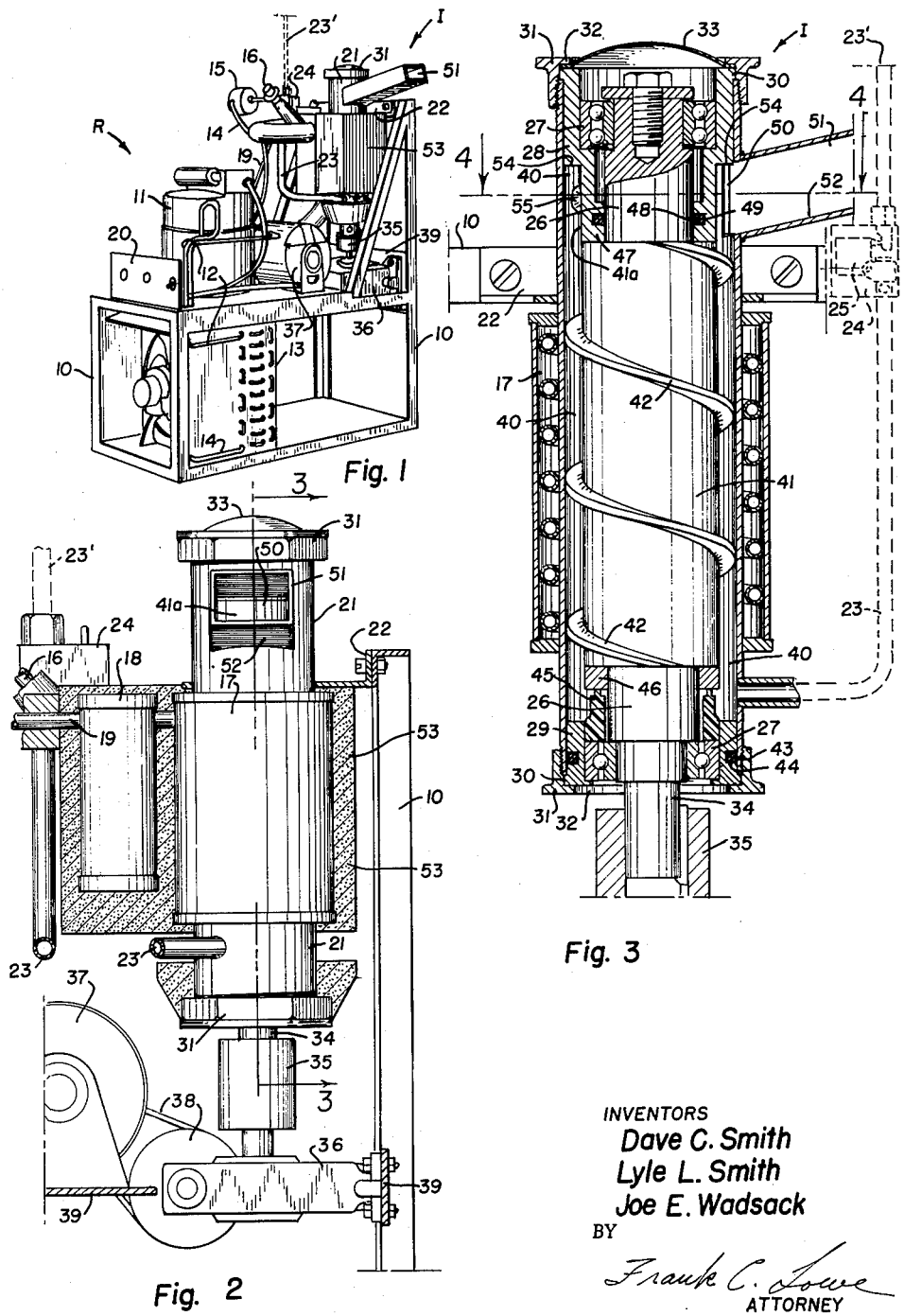
FIGURE 1 is a perspective view of an ice chip producing machine constructed according to the invention but with the cover plates forming the shell of the apparatus being removed to better show the components therewithin.
FIGURE 2 is an elevational view of a portion of the machine shown at FIG. 1, as taken substantially from the indicated arrow 2 at FIG. 1 but on an enlarged scale and with certain portions of the structure being broken away and being in section to illustrate parts otherwise hidden from view.
FIGURE 3 is a sectional elevational view of the freezing chamber of the ice chip producing unit of the machine, as taken substantially from the indicated line 3—3 at FIG. 2 but on a further enlarged scale, and with broken lines indicating diagrammatically, the water infeed components of the apparatus.
Figure 4:
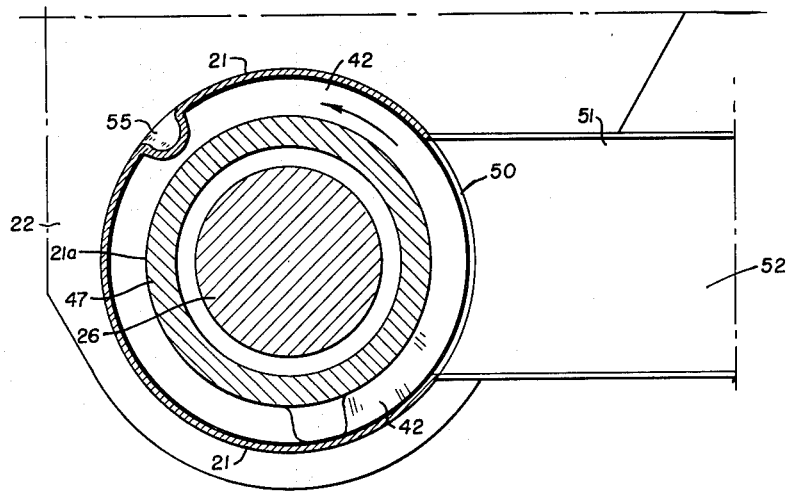
FIGURE 4 is a fragmentary sectional view as taken from the indicated line 4—4 at FIG. 3, but on a further enlarged scale and illustrating specifically a preferred construction embodying the invention.
Figure 5:
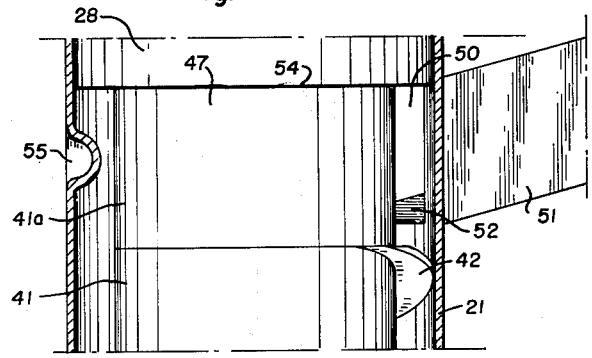
FIGURE 5 is a fragmentary, sectional view as taken substantially from the indicated line 5—5 at FIG. 4.

Referring to the drawing and particularly to FIG. 1 thereof, most of the components of the improved ice chip producing machine are essentially conventional although they are arranged in a compact manner and are mounted within a box-like framework 10. This framework is actually contained within a box-like shell, not shown, and this shell may or may not include, an ice receiving bin for holding ice chips produced by the machine.

The ice chip producing machine includes both the ice-chip producing apparatus I and the refrigeration apparatus R necessary in the operation of producing ice chips. The refrigeration apparatus R includes a standard motor-compressor 11 which compresses a refrigerant gas into a hot gas line 12 which enters the top of a condenser 13. The condenser is cooled by a fan or in any other suitable manner and the hot gas line 12 extends back and forth through this condenser towards the bottom thereof where it becomes a liquid line 14. Thence, the liquid line extends from the condenser and to the ice chip producing apparatus I where it first passes through a drier 15 and thence to its termination at an expansion valve 16. This expansion valve 16 is connected to the freezer-evaporator 17 which jackets an ice chip producing apparatus I as hereinafter described. A refrigerant is gasified in this chamber 17 and the cold gas from this chamber flows to refrigerant-overflow chamber 18. Thence, the gas flows through a return line 19 and to the motor-compressor. This conventional refrigeration apparatus will also include suitable safety, temperature, and cut-off controls which may be conveniently mounted upon a control board 20.

The ice chip producing apparatus I is formed within an upright cylindrical shell 21 which is carried within a suitable bracket 22 mounted on a frame member 10 as in the manner illustrated at FIG. 1. The lower end of this shell is closed by a water sealing means, as hereinafter described, to form a chamber whereinto water may flow to be converted into ice. As such, this shell 21 may be described as consisting of a lower freezing section and an upper chip-producing section, and the freezer-evaporator chamber 17 is formed as a jacket which embraces the lower freezing section of the shell 21.

A water supply line 23 taps into the base of this shell since the movement of ice and water within the shell 21 is upwardly and from the freezing section to the chip-producing section. To control and regulate the inflow of water into the apparatus, the supply line preferably extends upwardly alongside the shell to function as a standpipe and includes a chamber 24 at the level of the top of the freezing section, immediately above the evaporator jacket 17. A float valve 25 is mounted within this chamber to control the inflow of water into the apparatus and permit inflow only when the effective water level is below the float level in the chamber. The water line 23 extending from this float valve is connected with any suitable water supply source, not shown.

A comparatively heavy, axially-centered shaft 26 extends through this shell 21 and each end of this shaft is mounted in rigidly supported bearings 27. The bearings, in turn, are mounted within suitable sockets in an upper sleeve 8 and a lower sleeve 29 which fit into the respective ends of the shell 21. Each sleeve is provided with an outward shoulder 30 at its outer end which abuts against an end of the shell. Lock rings 31 are threaded over each end of the shell and over the shoulders 30 to secure the assembly of components within the shell. Each lock ring is formed with an inward annular flange 32 and the flange of the lower ring abuts against the shoulder 30 of the sleeve 29 while the flange of the upper ring abuts against the rim of a closure cap 33 which, in turn, rests upon the shoulder 30 of the upper sleeve 28.

The lower end of this shaft 26 projects below the shell 21 as a stub 34 which connects with a coupling 35 of a driving mechanism. This driving mechanism is adapted to rotate the shaft slowly and includes a speed reducer 36 having its slow speed output shaft connected to the coupling 35. It is driven by a suitable motor 37 which is connected with the input shaft of the reducer as through a suitable pulley-belt arrangement 38. These components are mounted upon suitable plates 39 which are carried upon the framework 10.

This construction of the shell 21 and shaft 26 extending therethrough, forms an annular chamber 40 wherethrough water moves in the formation of ice chips. That portion of the shaft 26, in the freezing section of the chamber and at the lower portion of the chip-producing section thereof, is enlarged to form a rotating inner chamber wall 41, of chamber 40, and a spiral wiping blade 42 outstands therefrom to snugly fit against the shell 21. This spiral blade 42 is thus adapted to rotate to wipe ice flakes and particles off the cylindrical wall of the shell 21 at the freezing section thereof. The spiral winds about the wall 41 upwardly in a direction opposite to the direction of rotation of the shaft to effect and facilitate upward movement of the ice particles scraped from the wall and to lift them upwardly above the water level to be then compressed and form ice chips.

The base of this chamber 40 is rendered watertight by suitable seals. One seal is located between the shell 21 and the lower sleeve 29 and may be an O-ring gasket 43 carried within a groove 44 at the outer face of the sleeve 29. Another seal is formed between the inner side of the sleeve 29 and the rotating shaft 26. This seal may be formed as a short tubular, resilient ring 45 snugly fitted in the sleeve 29 to upstand thereabove with the upper edge abutting against the bottom of an anti-friction washer 46 which, in turn, tightly fits upon the shaft 26 against the bottom of the enlarged wall section 41 of the shaft.

The upper portion of the chamber 40, at the upper portion of the chip-producing section, above the enlarged wall section 41 of the shaft, is formed as a fixed inner chamber wall 41a by a depending tubular extension 47 of the upper sleeve 28. This extension snugly embraces the shaft 26 with the base thereof abutting against the top of the rotating wall section 41. The outside diameter of this extension forming wall portion 41a is preferably the same as the diameter of the wall section 41 to provide a smooth continuation of the inner wall of the chamber 40. A water seal is provided between this extension and the shaft 26 by an O-ring gasket 48 carried in a groove 49 at the inner wall of the extension 47.

To complete the arrangement of the ice chip producing apparatus I, a suitable rectangular side outlet 50 is formed in the wall of the shell 21 at the upper portion of the chip producing section of the chamber 40 and a disposal chute 51 outstands from the shell at this opening. It is to be noted that this chute is preferably upwardly inclined and is formed with the floor 52 flush with the lower edge of the opening 50 to facilitate the return of any water which may drain from the ice chips moving into the chute. As a further feature, in order to insure efficient operation, the lower freezing section of the shell 21 and the overflow chamber 18 are conveniently encased in an insulating shell 53 which may be conveniently formed of closed cell types of polyurethane or polystyrene foam.

It is to be noted that the top or ceiling 54 of the annular chamber 40 is formed by an annular offset where the sleeve 28 is reduced in diameter to form the extension 47. In the present invention, in contrast with the prior art, this ceiling 50 is axially symmetrical and is either flat or slightly beveled for convenience in machining. Prior art constructions disclose generally inclined or plow-shaped ceiling structures to facilitate movement of ice from the chamber. The flat or squared ceiling structure not only permits a material simplification in machining operations to build the unit but also permits the use of an arrangement for producing better ice chips as will now be set forth.

The improvement over the art, in combination with the flat ceiling 54 resides in a means to partially interrupt the rotation action of ice moving into the chip producing section of the chamber 40. A preferred means for such interruption consists of a smooth, rounded indentation 55 in the wall of shell 21. This indentation 55 may be in the general form of a hemisphere, and it is preferably located at the approximate center level of the chute entrance and at an approximate angle of 135 degrees beyond the axis of the chute with reference to the direction of rotation of the shaft 26.

In the development of this unit, it was established that the small ice flakes and particles wiped off the wall of the shell 21 and moved upwardly by the spiral 42 formed shapeless slush ice at the water surface level. Some consolidation of the ice slush commenced as the rotating spiral 42 lifted this slush ice above the water level and as the slush ice was lifted by the spiral, it acquires the form of a tubular column of soft ice which continued to move upwardly into the chip producing section of the chamber. This column of soft ice rotated with the rotation of the spiral.

Continued upward movement of this tubular column of soft ice brought the column to the ceiling 54 and thereafter the column was compressed by the action of the rotating spiral. Without means for deflecting this column of soft ice out of the chamber, it tended to rotate with rotation of the spiral and the compression increased as more ice formed below it and finally, to the point where the column of ice solidified. Thereafter, the pressure built up by the rotation of the spiral to the point where the apparatus either jams or breaks. Without other means for deflecting the soft column of ice, the side outlet 50 is ineffectual in relieving this pressure and prior art structures employed the principle of either turning the column or splitting it before any substantial compressive action occurred.

In considering these factors wtih respect for the need of producing better ice chips, it was discovered that if the tubular column of soft ice were permitted to be pressed against a flat ceiling 54 with a substantial, but not excessive, pressure before being deflected, a far superior, drier chip resulted. Not only does the pressure squeeze water from the flakes but also the pressure causes a slight melting and refreezing action when it is released.

It was discovered that if the rotation and other movements of the column of soft ice was interrupted as it was pressing against the ceiling 54, before it could solidify, the column would then break apart at the side outlet 50 to fall into the chute 51. It was also discovered that the restrictive means to inhibit the rotation of this column of soft ice could be varied so that the ice chips would vary in their quality. An an extreme, the sloping ceiling constructions and sharp edge splitters of the prior art effectuated such action with a minimum of pressure on the chips. It was then discovered that a smooth or restricted interrupting device, such as the hemispherical indentation 55 in the wall 21 would not effectively inhibit such rotation of the ice column until a desired substantial pressure was built up. When the pressure against this indentation stopped the rotation with the ice column, the column would then crumble at outlet 50 to form solid dry chips.

It was further discovered that the size of the ice chips could be regulated by the positioning of this indentation with respect to the location of the outlet. The smallest chips are formed with an indentation 55 located adjacent to the trailing side of the outlet, as at the position indicated in broken lines at FIG. 6. Larger and harder chips are formed as the position of the indentation 55 is moved further from the trailing edge of the outlet 50 until a point is reached where the pressure of the tubular ice column becomes greater than that desired. In the units built by applicant, it was found that a desirable position was approximately 135 degrees beyond the axis of the outlet chute 51, in the direction of shaft rotation, as illustrated; however, such will vary considerably depending upon the respective proportions of the several components of the unit.

Figure 6:
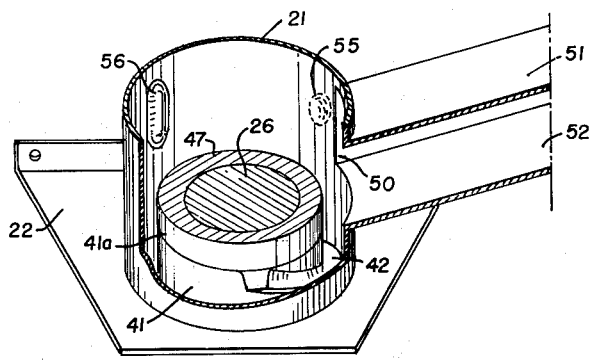
FIGURE 6 is a reduced scale, fragmentary, isometric view of the upper portion of the apparatus which is shown at FIGS. 3, 4 and 5 but with portions being broken away to show the interior thereof and illustrating a modified embodiment of the invention shown at FIGS. 4 and 5 and with broken lines illustrating yet another modification of the invention.

Other forms of indentations may be pressed in the wall of the shell 21 such as the somewhat elongated, oval indentation 56 illustrated at FIG. 6 and it appears that as long as the indentation does not extend completely across the space between the inner and outer walls of the chamber, or is not otherwise formed as to immediately divide or turn the ice column as it is formed a pre-compressing action occurs before the ice chips are discharged. In proper design, the indentation in the wall of the shell 21 should only partly intercept the rotating ice column and permit the soft slush ice to move past it without interruption and not become effective in stopping rotation until the slush ice is compressed and hardened to a substantial degree.

While I have now described my invention in considerable detail, it is obvious that others skilled in the art can build and devise alternate and equivalent constructions which are nevertheless within the spirit and scope of my invention. Hence, I desire that my invention be limited, not by the constructions illustrated and described, but only by the proper scope of the appended claims.

We claim:

1. In an ice chip producing machine of the type which comprises:

(a) an end-closed cylindrical shell arranged in a substantially upright manner with the lower portion thereof constituting a freezing section and the upper portion thereof constituting a chip-producing section,
(b) a freezing means embracing the freezing section of the shell,
(c) a water supply means adapted to maintain water within the shell at a level near the top of the freezing section,
(d) a rotatable shaft means axially centered in the shell and thereby forming an annular chamber between the shaft means and the shell wall,
(e) a spiral wiping blade on the shaft means at the freezing section and at the lower portion of the chip-producing section, with rotation of the shaft and spiralled blade thereon being adapted to scrape off ice flakes formed on the wall of the shell at the freezing section and to lift accumulated ice flakes as a cylindrical mass of slush ice upwardly and into the upper portion of the chip-producing section and to rotate this mass as it is being lifted; and,
(f) a side outlet at the upper portion of the chip-producing section;

The improvement which consists of:
(a) an annular ceiling at the top of the chip-producing section adapted to suppress upward movement of said cylindrical mass of slush ice, but to permit said mass to continue to rotate with the rotation of the said blade and to become thereby compressed and solidified by upward thrust action of the spiralled blade; and,
(b) an obstruction on the wall of the cylindrical shell protruding part way across the chip-producing section thereof radially offset with respect to said side outlet, but below the ceiling and above said spiral, which partially blocks the passageway of the shell wall and thereby permits the soft slush ice cylinder to flow therepast as it rotates with rotation of the blade but stops said rotative movement of the ice mass as it commences to solidify and becomes partially hardened, whereby to permit continued rotation of the blade to break down the cylinder of the partially hardened ice and eject it from the side outlet.

2. In the organization defined in claim 1, said obstruction being an indentation in the wall of the shell.

3. In the organization defined in claim 1, said obstruction being an indentation in the wall of said shell in the general form of a hemisphere.

4. In an ice chip producing machine of the type which comprises:
(a) an end-closed cylindrical shell arranged in a substantially upright manner with the lower portion thereof constituting a freezing section and the upper portion thereof constituting a chip-producing section;
(b) a freezing means embracing the freezing section of the shell;
(c) a water supply means adapted to maintain water within the shell at a level near the top of the freezing section;
(d) a rotatable shaft means axially centered in the shell and thereby forming an annular chamber between the shaft means and the shell wall;
(e) a spiral wiping blade on the shaft means at the freezing section and at the lower portion of the chip-producing section, with rotation of the shaft and spiralled blade thereon being adapted to scrape off ice flakes formed on the wall of the shell at the freezing section and to lift accumulated ice flakes as a cylindrical mass of slush ice upwardly and into the upper portion of the chip-producing section and to rotate this mass as it is being lifted; and,
(f) a side outlet at the upper portion of the chip-producing section;

The improvement which consists of:
(a) an annular ceiling at the top of the chip-producing section adapted to suppress upward movement of said cylindrical mass of slush ice, but to permit said mass to continue to rotate with the rotation of the said blade and to become thereby compressed and solidified by upward thrust action of the spiralled blade; and,
(b) an inward obstruction in the shell wall at the chip-producing section thereof radially offset with respect to said side outlet, having edges and corners generally rounded, whereby to produce a minimum interference with the flow of slush ice therepast as it rotates with the rotation of the blade, but is adapted to stop rotative movement of the ice mass as it commences to solidify and become partially hardened, whereby to permit continued rotation of the blade to break down the cylinder of partially hardened ice and eject it from the side outlet.

5. In the organization set forth in claim 4, wherein said obstruction is positioned on the wall of the shell at an approximate center position in the chip-producing section, below the ceiling and above the spiral.

6. In the organization defined in claim 4, wherein the obstruction is generally hemispherical at its inward portion.

References Cited by the Examiner

UNITED STATES PATENTS

| | | | |
|---|---|---|---|
| 2,753,694 | 7/56 | Trow et al. | 62—354 X |
| 2,952,141 | 9/60 | Nelson et al. | 62—354 |
| 3,034,311 | 5/62 | Nelson | 62—320 |
| 3,034,317 | 5/62 | Schneider et al. | 62—354 |
| 3,049,895 | 8/62 | Larson et al. | 62—354 |
| 3,101,598 | 8/63 | Ross | 62—354 |
| 3,162,022 | 12/64 | Relph et al. | 62—320 |

FOREIGN PATENTS 409,499 5/34 Great Britain.

ROBERT A. O'LEARY, *Primary Examiner.*